UNITED STATES PATENT OFFICE.

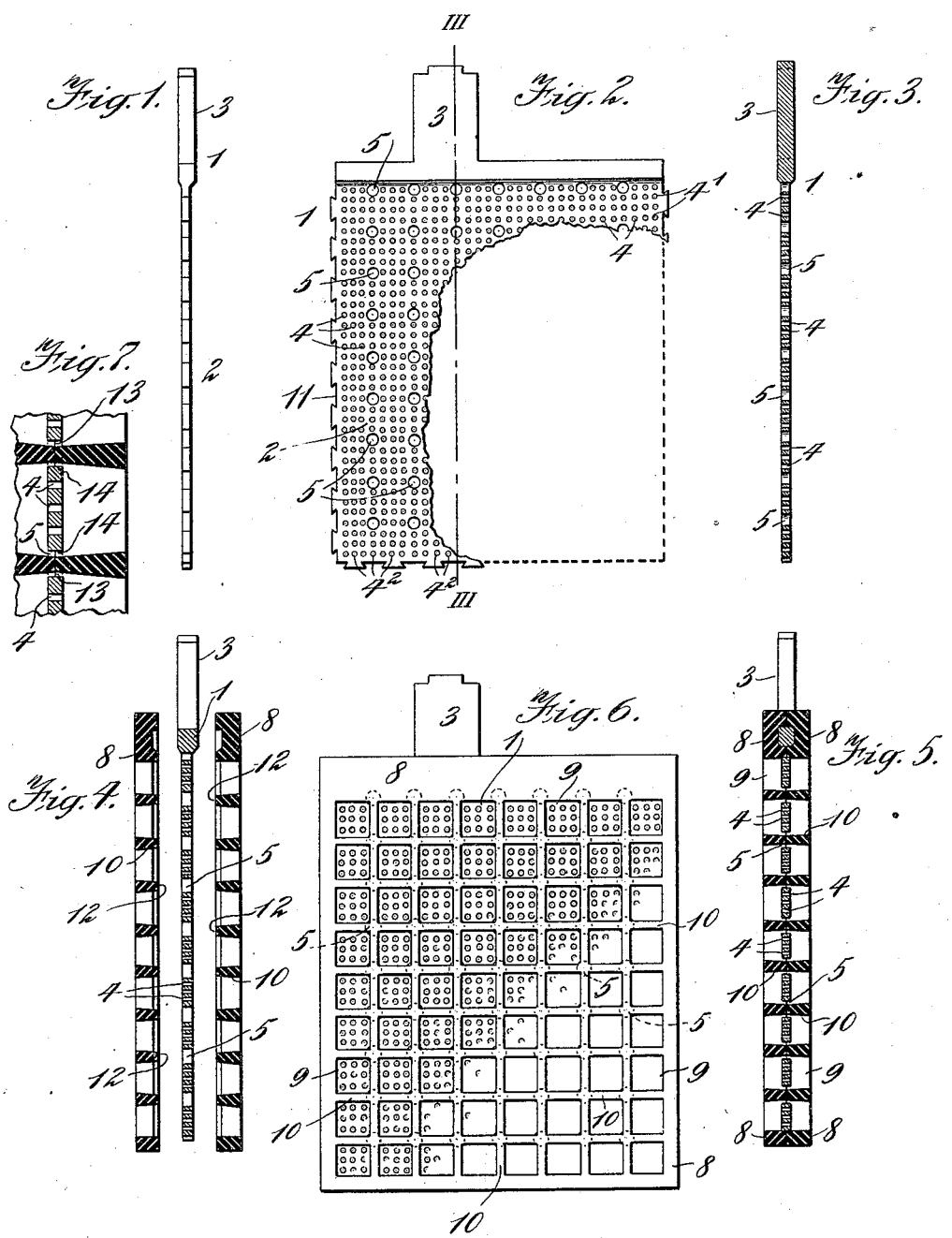
W. M. McDOUGALL.
STORAGE BATTERY PLATE.
APPLICATION FILED JULY 30, 1910.
1,051,147.
Patented Jan. 21, 1913.

WILLIAM M. McDOUGALL, OF EAST ORANGE, NEW JERSEY.

STORAGE-BATTERY PLATE.

1,051,147.

Specification of Letters Patent. Patented Jan. 21, 1913.

Application filed July 30, 1910. Serial No. 574,638.

*To all whom it may concern:*

Be it known that I, WILLIAM M. McDOUGALL, a citizen of the United States, residing at East Orange, in the county of Essex and State of New Jersey, have invented certain new and useful Improvements in Storage-Battery Plates, of which the following is a full, clear, and exact description.

This invention relates to storage battery plates, and has for its object the production of a plate in which the active material is securely held in position, stiffening means being provided which substantially obviate all tendency to buckle and which means coöperate with the active material to protect the conducting element or plate, thereby prolonging the life of the structure and materially increasing its efficiency.

A storage battery plate constructed in accordance with the principles of my invention is substantially proof against buckling, distortion, or other damage, due to continued or even improper usage. The connecting element preferably extends in unbroken continuity across the plate and is disposed to properly resist strains.

A second object of the invention is to provide a plate in which a sufficient quantity of active material is contained in position of the most efficient action, and in which good contact is made with a suitable metallic grid or conductor, such conductor being preferably centrally disposed to the plate. This grid or conductor is further so embedded and surrounded by an insulating mass as to prevent the access of acid thereto through any cracks or crevices which might permit local and deleterious action. In the practical carrying out of the invention, this grid or conductor is made to serve as a strengthening element in addition to its functions as a conductor. The insulating mass in which the grid or conductor is embedded serves to retain the active material in its proper place and to resist warping or buckling of the plate in addition to its function of protecting said grid or conductor.

With these and other objects in view my invention consists in the features of construction and combination as hereinafter set forth and claimed.

Referring to the drawings: Figure 1 is a side elevation of the central conductor or grid. Fig. 2 is a front view of the same. Fig. 3 is a vertical section taken on the line III—III of Fig. 2. Fig. 4 is a sectional view showing the parts of the storage battery plate in position ready for assembling. Fig. 5 is a view of the same showing the said parts assembled; the vulcanizing operation having been accomplished, resulting in the production of a unitary structure. Fig. 6 is a front view of the same. Fig. 7 is a detail sectional view showing some of the pockets of the insulating frame and further showing the manner in which the insulating grids are united at the respective uniting points throughout the plate.

Referring to the drawings in which like parts are designated by the same reference sign, 1 designates the grid or conductor which I make in practice of a plate of lead which is preferably rolled throughout the major portion of its length to form a thin sheet 2. At its thick end the plate is cut to form a lug 3 which forms the terminal lug. In the above form the plate is subjected to the action of a perforating machine so that it is filled with small openings 4 through the entire area of its thin portion 2. These openings need not be arranged in any particular series or order, but I prefer to have them extend in parallel rows with certain rectilinearly extending series $4'$ and $4^2$ at right angles to one another, and which are separated by equal distances and are adapted to produce certain results hereinafter referred to. The plate is further preforated with a rectangularly extending series of larger holes 5, which are also separated and arranged according to certain principles later pointed out. I regard the best disposition of the large holes 5 as that shown in Fig. 2, where they lie at the intersection of some of the rows $4'$ and $4^2$ of the smaller openings which have been referred to. It will be observed also that I preferably form these large openings generally circular, although it is obvious that other forms may be employed. Certain results however are obtained in making the said openings circular, one of which it may be here stated, is the cheapening of the cost of producing the plate; round dies costing less to manufacture than dies of a square or other non-circular form. I do not desire to be limited or restricted to a grid or conductor of this particular form, since any reticulated or foraminous screen or sheet will answer. I do regard it, however, as essential that the sheet have numerous lines of unbroken continuity extending both in horizontal and vertical directions, the object being to secure a strong tension element to resist lateral and vertical swelling of the plate; and it is hence of the utmost importance that the perforations and apertures be non-extensive, both the width and breadth thereof being small as compared to the size of the plate.

A plate as above constructed is embedded in an insulating mass 8 (see Fig. 5) which entirely surrounds and incloses the plate except for numerous pockets or openings 9 through which the grid 1 is exposed on both sides, if the active material is not in position. The arrangement and disposition of the pockets 9 may be anything desired, but I strongly prefer that shown in Fig. 6, in which the pockets are made square and in a checker-board formation over the entire face of the plate. This arrangement produces vertical and horizontally extending ribs or partitions 10 between the pockets 9, and these ribs or partitions 10 extend in directions adapted to exactly overlie the centers of the openings 5 of the grid, at the intersection of the said ribs. In this relation some of the series of openings 4' and $4^2$ of the grid are also covered by the ribs 10 of the insulating frame. The insulating frame 8 may be applied to the lead grid in any desired way, but I prefer to make it of rubber and vulcanize it in two halves upon the inclosed grid. The frame 8 may be made in two halves in this way, as illustrated in Fig. 4, the two halves being assembled and vulcanized upon the inclosed grid by suitable pressure, so that they may coalesce or weld together at all portions of the grid 1, where their union is unobstructed, viz., around the outside edges of the grid; through such of the holes 4' and $4^2$ as are covered on both sides by the ribs 10; and at the points of intersection of the said ribs substantially at the centers of the various openings 5. The result is that the grid is substantially completely embedded in and surrounded by the insulating mass and is protected from any local action of the acid which might occur if the latter had access to the grid at crevices or points around its side edges. The ribs are thus integrally united together through various openings in the conductive grid and the resultant plate is therefore stiffened against warping or buckling by the ribs 10 which are in a sense trussed together from opposite sides in both directions. The plate is prevented from swelling or expanding either vertically or laterally by the tensile strength of the central metallic grid, which has numerous lines of vertical and horizontal continuity through which the full tensile strength of the metal can be obtained. The metal is very thoroughly locked to the insulating frame parts 8 which surround it, on account of the fact that the latter have portions that join together through the various holes or openings of the grid. It is obvious that if the plate 2 be made sufficiently thin, the insulating material when in plastic condition may be forced down into the respective openings 5, 4' and $4^2$ at the places where such openings occur so that it enters substantially half way into the body of the conductive grid, and as the plastic material upon the other side of such grid is correspondingly forced into the said openings, a line of jointure is effected between the respective sections of insulating material substantially on the median plane of the conductive grid. Referring to Fig. 7, it will be observed that owing to the relatively large diameter of the openings 5 the jointure of the insulating material does not completely cover or fill the said openings but forms substantially a cross therein of somewhat peculiar construction, and thereby affords additional spaces through which the active material may pass, increasing the efficiency of the plate. Attention is also directed to the notches or recesses 11, the walls of which are undercut as shown in Fig. 2. These notches are engaged by tongues which are pressed thereinto from the material of the adjoining insulating mass, such material uniting firmly together and in effect forming with the notched plate a series of dovetail joints or connections. This arrangement of the material strengthens the plate and locks the insulating grids or mass more firmly together and particularly to the edges of the conductive grid.

In practice it is sometimes advisable to form the insulating grids with projections 12 thereon previous to assembling, this being the case when the plate 2 is relatively thick and when the material from which the insulating grids are formed will not conveniently flow into the openings a sufficient distance to allow the respective parts of the insulating grids to unite. The various elements therefore coöperate and interlock together to produce a very strong plate. The active material is inserted into the pockets formed by the openings 9, these pockets preferably having the form of truncated pyramids, since the sides or walls of the pockets should taper somewhat, such walls being in effect slightly undercut in order to better retain the active material, even if the latter should contract; a very slight ta per sufficing to effect this result. Inasmuch as the pockets of opposite sides of the plate are joined together through the perforations 4 of the grid and also through portions of the apertures 5, it is obvious that the active material on both sides is not only joined together and secured against dislodgment in this way, but that a good contact is insured between the active material and the grid which constitutes the conductor for electrically uniting the active material and the terminal lug 3 of the plate.

By reason of the small size of the apertures in the conductive plate and by reason of the neat engagement with portions of the sides of the larger apertures, to wit, those points where the extremities of the arms of the cross shaped lugs 13 engage with the sides or walls of the apertures 5, such points being indicated at 14 in Fig. 7, the body portions of the metallic plate are held against lateral movement in the plane of the plate, while the grids efficiently serve to prevent lateral movement normal to the plane of said plate, resulting substantially in the prevention of any lateral distortion whatsoever. While the assembled grids in the plate are rigid as a whole, the insulating material of which the grids are formed has nevertheless sufficient elasticity to permit it to make a solution tight joint with the active material regardless of the expansion of the latter; the rubber mass being of just sufficient rigidity combined with elasticity to accomplish this desirable result. In charging and discharging storage batteries of the types where the lead comes in direct contact with the solution, it has been found that the areas of the active material adjacent to or in contact with the lead and exposed to the solution, retain the sulfuric acid and become sulfated, unless great care is constantly exercised. But if the acid solution is entirely kept away from the lead and only brought in contact with the active material in the manner in which this is done in the battery which forms the subject matter of this application, it will be found that sulfating will not occur, even under exceedingly unfavorable conditions of use.

What I claim, is:—

1. A battery plate comprising a metallic sheet having non-extensive perforations therein, insulating material in the form of substantially rigid grids secured to the respective sides of said sheet, insulating material disposed to form connecting elements extending through certain of the perforations in said sheet, the respective ends of said elements being permanently united to the grid material, the body portions of said metallic sheet being held against any lateral movement thereof between the said rigid grids, to prevent warping.

2. A battery plate comprising a metallic sheet having relatively small apertures therein, insulating material in the form of substantially rigid grids secured to the respective sides of said sheet, insulating material disposed to form connecting elements extending through certain of the perforations in said sheet and in neat engagement therewith, the respective ends of said elements being permanently united to the grid material, the body portions of said metallic sheet being held thereby against lateral movement in any direction between the said grids, to prevent warping.

3. A battery element comprising active material, a metallic conductive plate having numerous non-extensive perforations therethrough, rigid insulating grids upon the respective sides of said plate, united thereto and to each other by permanently joined, integrally formed, connecting elements disposed within certain of the perforations of said grids, said plates and grids so united forming a unitary structure wherein the metallic portions are protected by said grids and said active material and are firmly held against vertical or lateral distortion due to the expansion of said active material.

4. A storage battery element comprising a thin metallic plate having non-extensive perforations throughout its active area, a mass of insulating compound in which said plate is embedded, said mass having portions united through the openings of said plate and having pockets through which said plate is exposed, and active material contained within said pockets and adapted to form a solution tight engagement with the walls thereof, said compound being substantially rigid but having sufficient elasticity to permit it to make a solution tight joint with the active material regardless of expansion of the latter.

5. A battery plate comprising a metallic sheet having a plurality of notches in the edges thereof, insulating material in the form of grids secured to the respective sides of said sheet and insulating material disposed to form connecting elements for said grids extending into the notches aforesaid.

6. A battery plate comprising a metallic sheet having a plurality of notches, the walls of which are undercut, in the edges of said sheet, insulating material in the form of grids secured to the respective sides of said sheet, and insulating material disposed to form connecting elements extending into the notches aforesaid.

7. A battery plate comprising a plurality of elements united together to form a unitary structure, one of said elements being positioned between adjoining elements of unlike material to the said one, elements of differing materials being interlocked by tongue and recess engagements therebetween at a plurality of points along the respective edges thereof.

8. A battery plate comprising a plurality of elements united together to form a unitary structure, one of said elements being positioned beside an adjoining element of unlike material to the said one, said elements of differing materials being interlocked by projection and recess engagements therebetween at points along the respective edges thereof.

In witness whereof, I subscribe my signature, in the presence of two witnesses.

WILLIAM M. McDOUGALL.

Witnesses:
WALDO M. CHAPIN,
CHAS. P. HIDDEN.

Copies of this patent may be obtained for five cents each, by addressing the "Commissioner of Patents, Washington, D. C."